(12) United States Patent
Luebke et al.

(10) Patent No.: US 8,570,634 B2
(45) Date of Patent: Oct. 29, 2013

(54) IMAGE PROCESSING OF AN INCOMING LIGHT FIELD USING A SPATIAL LIGHT MODULATOR

(75) Inventors: David Patrick Luebke, Charlottesville, VA (US); Wolfgang Heidrich, Vancouver (CA)

(73) Assignee: NVIDIA Corporation, Santa Clara, CA (US)

( * ) Notice: Subject to any disclaimer, the term of this patent is extended or adjusted under 35 U.S.C. 154(b) by 263 days.

(21) Appl. No.: 11/974,316

(22) Filed: Oct. 11, 2007

(65) Prior Publication Data

US 2009/0097092 A1    Apr. 16, 2009

(51) Int. Cl.
G02F 1/00 (2006.01)

(52) U.S. Cl.
USPC .......................................... 359/237

(58) Field of Classification Search
USPC .......................................... 359/237
See application file for complete search history.

(56) References Cited

U.S. PATENT DOCUMENTS

| | | |
|---|---|---|
| 3,904,818 A | 9/1975 | Kovac |
| 4,253,120 A | 2/1981 | Levine |
| 4,646,251 A | 2/1987 | Hayes et al. |
| 4,685,071 A | 8/1987 | Lee |
| 4,739,495 A | 4/1988 | Levine |
| 4,771,470 A | 9/1988 | Geiser et al. |
| 4,920,428 A | 4/1990 | Lin et al. |
| 4,987,496 A | 1/1991 | Greivenkamp, Jr. |
| 5,175,430 A | 12/1992 | Enke et al. |
| 5,261,029 A | 11/1993 | Abi-Ezzi et al. |
| 5,305,994 A | 4/1994 | Matsui et al. |
| 5,387,983 A | 2/1995 | Sugiura et al. |
| 5,475,430 A | 12/1995 | Hamada et al. |
| 5,513,016 A | 4/1996 | Inoue |
| 5,608,824 A | 3/1997 | Shimizu et al. |
| 5,652,621 A | 7/1997 | Adams, Jr. et al. |
| 5,793,433 A | 8/1998 | Kim et al. |
| 5,878,174 A | 3/1999 | Stewart et al. |
| 5,903,273 A | 5/1999 | Mochizuki et al. |

(Continued)

FOREIGN PATENT DOCUMENTS

| | | |
|---|---|---|
| CN | 1275870 | 12/2000 |
| EP | 0392565 | 10/1990 |

(Continued)

OTHER PUBLICATIONS http://englishrussia.com/?p=1377.

(Continued)

*Primary Examiner* — Joseph P Martinez

(57) ABSTRACT

A method, computer-usable medium and a system for varying an incoming light field are disclosed. Embodiments provide mechanisms for performing image processing on an incoming light field using a spatial light modulator which is adjusted based upon characteristics of the incoming light field. The spatial light modulator may be positioned between the viewed scene and the eye, and therefore, may be semi-transparent. The image processing may consist of tone mapping, color enhancement, beautification, edge enhancement, spectral separation of colors, spectral separation of metamers, object emphasis, other image processing, or some combination thereof. Additionally, embodiments compensate for parallax errors by adjusting the spatial light modulator based upon the position of an observer with respect to the spatial light modulator. And further, embodiments may be incorporated into optical devices, wearable optical devices, windows, windshields, and the like, where the semi-transparent spatial light modulator adjusts the image before entering the eye.

20 Claims, 13 Drawing Sheets

(56) References Cited

U.S. PATENT DOCUMENTS

| | | | |
|---|---|---|---|
| 5,905,530 A | 5/1999 | Yokota et al. | |
| 5,995,109 A | 11/1999 | Goel et al. | |
| 6,016,474 A | 1/2000 | Kim et al. | |
| 6,078,331 A | 6/2000 | Pulli et al. | |
| 6,111,988 A | 8/2000 | Horowitz et al. | |
| 6,118,547 A | 9/2000 | Tanioka | |
| 6,141,740 A | 10/2000 | Mahalingaiah et al. | |
| 6,151,457 A | 11/2000 | Kawamoto | |
| 6,175,430 B1 | 1/2001 | Ito | |
| 6,252,611 B1 | 6/2001 | Kondo | |
| 6,256,038 B1 | 7/2001 | Krishnamurthy | |
| 6,281,931 B1 | 8/2001 | Tsao et al. | |
| 6,289,103 B1 | 9/2001 | Sako et al. | |
| 6,314,493 B1 | 11/2001 | Luick | |
| 6,319,682 B1 | 11/2001 | Hochman | |
| 6,323,934 B1 | 11/2001 | Enomoto | |
| 6,392,216 B1 | 5/2002 | Peng-Tan | |
| 6,396,397 B1 | 5/2002 | Bos et al. | |
| 6,438,664 B1 | 8/2002 | McGrath et al. | |
| 6,486,971 B1 | 11/2002 | Kawamoto | |
| 6,504,952 B1 | 1/2003 | Takemura et al. | |
| 6,584,202 B1 | 6/2003 | Montag et al. | |
| 6,594,388 B1 | 7/2003 | Gindele et al. | |
| 6,683,643 B1 | 1/2004 | Takayama et al. | |
| 6,707,452 B1 | 3/2004 | Veach | |
| 6,724,932 B1 | 4/2004 | Ito | |
| 6,737,625 B2 | 5/2004 | Baharav et al. | |
| 6,760,080 B1* | 7/2004 | Moddel et al. | 349/13 |
| 6,785,814 B1 | 8/2004 | Usami et al. | |
| 6,806,452 B2 | 10/2004 | Bos et al. | |
| 6,839,062 B2 | 1/2005 | Aronson et al. | |
| 6,856,441 B2* | 2/2005 | Zhang et al. | 359/245 |
| 6,891,543 B2 | 5/2005 | Wyatt | |
| 6,900,836 B2 | 5/2005 | Hamilton, Jr. | |
| 6,950,099 B2 | 9/2005 | Stollnitz et al. | |
| 7,009,639 B1 | 3/2006 | Une et al. | |
| 7,015,909 B1 | 3/2006 | Morgan, III et al. | |
| 7,023,479 B2 | 4/2006 | Hiramatsu et al. | |
| 7,088,388 B2 | 8/2006 | MacLean et al. | |
| 7,092,018 B1 | 8/2006 | Watanabe | |
| 7,106,368 B2 | 9/2006 | Daiku et al. | |
| 7,133,041 B2 | 11/2006 | Kaufman et al. | |
| 7,133,072 B2 | 11/2006 | Harada | |
| 7,146,041 B2 | 12/2006 | Takahashi | |
| 7,221,779 B2 | 5/2007 | Kawakami et al. | |
| 7,227,586 B2 | 6/2007 | Finlayson et al. | |
| 7,245,319 B1 | 7/2007 | Enomoto | |
| 7,305,148 B2 | 12/2007 | Spampinato et al. | |
| 7,343,040 B2 | 3/2008 | Chanas et al. | |
| 7,486,844 B2 | 2/2009 | Chang et al. | |
| 7,502,505 B2 | 3/2009 | Malvar et al. | |
| 7,580,070 B2 | 8/2009 | Yanof et al. | |
| 7,627,193 B2 | 12/2009 | Alon et al. | |
| 7,671,910 B2 | 3/2010 | Lee | |
| 7,728,880 B2 | 6/2010 | Hung et al. | |
| 7,750,956 B2 | 7/2010 | Wloka | |
| 7,912,279 B2 | 3/2011 | Hsu et al. | |
| 8,049,789 B2 | 11/2011 | Innocent | |
| 2001/0001234 A1 | 5/2001 | Addy et al. | |
| 2001/0012113 A1 | 8/2001 | Yoshizawa et al. | |
| 2001/0012127 A1 | 8/2001 | Fukuda et al. | |
| 2001/0015821 A1 | 8/2001 | Namizuka et al. | |
| 2001/0019429 A1 | 9/2001 | Oteki et al. | |
| 2001/0021278 A1 | 9/2001 | Fukuda et al. | |
| 2001/0033410 A1* | 10/2001 | Helsel et al. | 359/290 |
| 2001/0050778 A1 | 12/2001 | Fukuda et al. | |
| 2001/0054126 A1 | 12/2001 | Fukuda et al. | |
| 2002/0012131 A1 | 1/2002 | Oteki et al. | |
| 2002/0015111 A1 | 2/2002 | Harada | |
| 2002/0018244 A1 | 2/2002 | Namizuka et al. | |
| 2002/0027670 A1 | 3/2002 | Takahashi et al. | |
| 2002/0033887 A1 | 3/2002 | Hieda et al. | |
| 2002/0041383 A1 | 4/2002 | Lewis, Jr. et al. | |
| 2002/0044778 A1 | 4/2002 | Suzuki | |
| 2002/0054374 A1 | 5/2002 | Inoue et al. | |
| 2002/0063802 A1 | 5/2002 | Gullichsen et al. | |
| 2002/0105579 A1 | 8/2002 | Levine et al. | |
| 2002/0126210 A1 | 9/2002 | Shinohara et al. | |
| 2002/0146136 A1 | 10/2002 | Carter, Jr. | |
| 2002/0149683 A1 | 10/2002 | Post | |
| 2002/0158971 A1 | 10/2002 | Daiku et al. | |
| 2002/0167202 A1 | 11/2002 | Pfalzgraf | |
| 2002/0167602 A1 | 11/2002 | Nguyen | |
| 2002/0191694 A1 | 12/2002 | Ohyama et al. | |
| 2002/0196470 A1 | 12/2002 | Kawamoto et al. | |
| 2003/0035100 A1 | 2/2003 | Dimsdale et al. | |
| 2003/0067461 A1 | 4/2003 | Fletcher et al. | |
| 2003/0122825 A1 | 7/2003 | Kawamoto | |
| 2003/0142222 A1 | 7/2003 | Hordley | |
| 2003/0146975 A1 | 8/2003 | Joung et al. | |
| 2003/0169353 A1 | 9/2003 | Keshet et al. | |
| 2003/0169918 A1 | 9/2003 | Sogawa | |
| 2003/0197701 A1 | 10/2003 | Teodosiadis et al. | |
| 2003/0222995 A1 | 12/2003 | Kaplinsky et al. | |
| 2003/0223007 A1 | 12/2003 | Takane | |
| 2004/0001061 A1 | 1/2004 | Stollnitz et al. | |
| 2004/0001234 A1 | 1/2004 | Curry et al. | |
| 2004/0032516 A1 | 2/2004 | Kakarala | |
| 2004/0066970 A1 | 4/2004 | Matsugu | |
| 2004/0100588 A1 | 5/2004 | Hartson et al. | |
| 2004/0101313 A1* | 5/2004 | Akiyama | 398/174 |
| 2004/0109069 A1 | 6/2004 | Kaplinski et al. | |
| 2004/0189875 A1 | 9/2004 | Zhai et al. | |
| 2004/0218071 A1 | 11/2004 | Chauville et al. | |
| 2004/0247196 A1 | 12/2004 | Chanas et al. | |
| 2005/0007378 A1 | 1/2005 | Grove | |
| 2005/0007477 A1 | 1/2005 | Ahiska | |
| 2005/0030395 A1 | 2/2005 | Hattori | |
| 2005/0046704 A1 | 3/2005 | Kinoshita | |
| 2005/0099418 A1 | 5/2005 | Cabral et al. | |
| 2005/0185058 A1 | 8/2005 | Sablak | |
| 2005/0238225 A1 | 10/2005 | Jo et al. | |
| 2005/0243181 A1 | 11/2005 | Castello et al. | |
| 2005/0248671 A1 | 11/2005 | Schweng | |
| 2005/0261849 A1 | 11/2005 | Kochi et al. | |
| 2005/0286097 A1 | 12/2005 | Hung et al. | |
| 2006/0050158 A1 | 3/2006 | Irie | |
| 2006/0061658 A1 | 3/2006 | Faulkner et al. | |
| 2006/0087509 A1 | 4/2006 | Ebert et al. | |
| 2006/0133697 A1 | 6/2006 | Uvarov et al. | |
| 2006/0176375 A1 | 8/2006 | Hwang et al. | |
| 2006/0197664 A1 | 9/2006 | Zhang et al. | |
| 2006/0274171 A1 | 12/2006 | Wang | |
| 2006/0290794 A1 | 12/2006 | Bergman et al. | |
| 2006/0293089 A1 | 12/2006 | Herberger et al. | |
| 2007/0091188 A1 | 4/2007 | Chen et al. | |
| 2007/0147706 A1 | 6/2007 | Sasaki et al. | |
| 2007/0171288 A1 | 7/2007 | Inoue et al. | |
| 2007/0236770 A1* | 10/2007 | Doherty et al. | 359/238 |
| 2007/0247532 A1 | 10/2007 | Sasaki | |
| 2007/0285530 A1 | 12/2007 | Kim et al. | |
| 2008/0030587 A1 | 2/2008 | Helbing | |
| 2008/0062164 A1 | 3/2008 | Bassi et al. | |
| 2008/0101690 A1 | 5/2008 | Hsu et al. | |
| 2008/0143844 A1 | 6/2008 | Innocent | |
| 2009/0010539 A1 | 1/2009 | Guarnera et al. | |
| 2009/0116750 A1 | 5/2009 | Lee et al. | |
| 2009/0160957 A1 | 6/2009 | Deng et al. | |
| 2009/0257677 A1 | 10/2009 | Cabral et al. | |
| 2010/0266201 A1 | 10/2010 | Cabral et al. | |

FOREIGN PATENT DOCUMENTS

| | | |
|---|---|---|
| EP | 1449169 | 5/2003 |
| EP | 1378790 | 7/2004 |
| EP | 144977 | 8/2004 |
| EP | 1550980 | 7/2005 |
| GB | 2045026 | 10/1980 |
| GB | 2363018 | 5/2001 |
| JP | 61187467 | 8/1986 |
| JP | 62151978 | 7/1987 |
| JP | 07015631 | 1/1995 |
| JP | 8036640 | 2/1996 |
| JP | 08-079622 | 3/1996 |

(56) References Cited

FOREIGN PATENT DOCUMENTS

| | | |
|---|---|---|
| JP | 2000516752 | 12/2000 |
| JP | 2001052194 | 2/2001 |
| JP | 2002-207242 | 7/2002 |
| JP | 2003-085542 | 3/2003 |
| JP | 2004-221838 | 8/2004 |
| JP | 2005094048 | 4/2005 |
| JP | 2005-182785 | 7/2005 |
| JP | 2005520442 | 7/2005 |
| JP | 2006025005 | 1/2006 |
| JP | 2006086822 | 3/2006 |
| JP | 2006-094494 | 4/2006 |
| JP | 2006121612 | 5/2006 |
| JP | 2006134157 | 5/2006 |
| JP | 2007019959 | 1/2007 |
| JP | 2007-148500 | 6/2007 |
| JP | 2007-233833 | 9/2007 |
| JP | 2007282158 | 10/2007 |
| JP | 2008085388 | 4/2008 |
| JP | 2008113416 | 5/2008 |
| JP | 2008277926 | 11/2008 |
| JP | 2009021962 | 1/2009 |
| KR | 1020040043156 | 5/2004 |
| KR | 1020060068497 | 6/2006 |
| KR | 1020070004202 | 1/2007 |
| WO | 03043308 | 5/2003 |
| WO | 2004063989 | 7/2004 |
| WO | 2007056459 | 5/2007 |
| WO | 2007093864 | 8/2007 |

OTHER PUBLICATIONS

"A Pipelined Architecture for Real-Time Correction of Barrel Distortion in Wide-Angle Camera Images", Hau, T. Ngo, Student Member, IEEE and Vijayan K. Asari, Senior Member IEEE, IEEE Transaction on Circuits and Systems for Video Technology: vol. 15 No. 3 Mar. 2005 pp. 436-444.
J. Bolz, P. Schroder; "rapid evaluation of catmull-clark subdivision surfaces"; Web 3D '02.
Loop, C., DeRose, T., Generalized B-Spline surfaces of arbitrary topology, Aug. 1990, SIGRAPH 90, pp. 347-356.
M. Halstead, M. Kass, T. DeRose; "efficient, fair interpolation using catmull-clark surfaces"; Sep. 1993; Computer Graphics and Interactive Techniques, Proc; pp. 35-44.
T. DeRose, M., Kass, T. Troung; "subdivision surfaces in character animation"; Jul. 1998; Computer Graphics and Interactive Techniques, Proc; pp. 85-94.
Takeuchi, S., Kanai, T., Suzuki, H., Shimada, K., Kimura, F., Subdivision surface fitting with QEM-based mesh simplification and reconstruction of approximated B-spline surfaces, 2000, Eighth Pacific Conference on computer graphics and applications, pp. 202-212.
Krus, M., Bourdot, P., Osorio, A., Guisnel, F., Thibault, G., Adaptive tessellation of connected primitives for interactive walkthroughs in complex industrial virtual environments, Jun. 1999, Proceedings of the Eurographics workshop, pp. 1-10.
"A Pipelined Architecture for Real-Time Correction of Barrel Distortion in Wide-Angle Camera Images", Hau, T. Ngo, Student Member, IEEE and Vijayan K. Asari, Senior Member IEEE, IEEE Transaction on Circuits and Systems for Video Technology: vol. 15 No. 3 Mar. 2005 pp. 436-444
"Calibration and removal of lateral chromatic aberration in images" Mallon, et al. Science Direct Copyright 2006; 11 pages.
"Method of Color Interpolation in a Single Sensor Color Camera Using Green Channel Seperation" Weerasighe, et al Visual Information Processing Lab, Motorola Austrailan Research Center pp. IV-3233-IV3236, 2002.
D. Doo, M. Sabin "Behaviour of recrusive division surfaces near extraordinary points"; Sep. 1978; Computer Aided Design; vol. 10, pp. 356-360.
D. W. H. Doo; "A subdivision algorithm for smoothing down irregular shaped polyhedrons"; 1978; Interactive Techniques in Computer Aided Design; pp. 157-165.
Davis, J., Marschner, S., Garr, M., Levoy, M., Filling holes in complex surfaces using volumetric diffusion, Dec. 2001, Stanford University, pp. 1-9.
E. Catmull, J. Clark, "recursively generated B-Spline surfaces on arbitrary topological meshes"; Nov. 1978; Computer aided design; vol. 10; pp. 350-355.
J. Stam; "Exact Evaluation of Catmull-clark subdivision surfaces at arbitrary parameter values"; Jul. 1998; Computer Graphics; vol. 32; pp. 395-404.
Kumar, S., Manocha, D., Interactive display of large scale trimmed NURBS models, 1994, University of North Carolina at chapel Hill, Technical Report, pp. 1-36.
Kuno et al. "New Interpolation Method Using Discriminated Color Correlation for Digital Still Cameras" IEEE Transac. On Consumer Electronics, vol. 45, No. 1, Feb. 1999, pp. 259-267.
Donald D. Spencer, "Illustrated Computer Graphics Dictionary", 1993, Camelot Publishing Company, p. 272.
Duca et al., "A Relational Debugging Engine for Graphics Pipeline, International Conference on Computer Graphics and Interactive Techniques", ACM SIGGRAPH Jul. 2005, pp. 453-463.
gDEBugger, graphicRemedy, http://www.gremedy.com, Aug. 8, 2006, pp. 1-18.
Keith R. Slavin; Application as Filed entitled "Efficient Method for Reducing Noise and Blur in a Composite Still Image From a Rolling Shutter Camera"; U.S. Appl. No. 12/069,669, filed Feb. 11, 2008.
Ko et al., "Fast Digital Image Stabilizer Based on Gray-Coded Bit-Plane Matching", IEEE Transactions on Consumer Electronics, vol. 45, No. 3, pp. 598-603, Aug. 1999.
Ko, et al., "Digital Image Stabilizing Algorithms Basd on Bit-Plane Matching", IEEE Transactions on Consumer Electronics, vol. 44, No. 3, pp. 617-622, Aug. 1988.
Morimoto et al., "Fast Electronic Digital Image Stabilization for Off-Road Navigation", Computer Vision Laboratory, Center for Automated Research University of Maryland, Real-Time Imaging, vol. 2, pp. 285-296, 1996.
Paik et al., "An Adaptive Motion Decision system for Digital Image Stabilizer Based on Edge Pattern Matching", IEEE Transactions on Consumer Electronics, vol. 38, No. 3, pp. 607-616, Aug. 1992.
Parhami, Computer Arithmetic, Oxford University Press, Jun. 2000, pp. 413-418.
S. Erturk, "Digital Image Stabilization with Sub-Image Phase Correlation Based Global Motion Estimation", IEEE Transactions on Consumer Electronics, vol. 49, No. 4, pp. 1320-1325, Nov. 2003.
S. Erturk, "Real-Time Digital Image Stabilization Using Kalman Filters", http://www,ideallibrary.com, Real-Time Imaging 8, pp. 317-328, 2002.
Uomori et al., "Automatic Image Stabilizing System by Full-Digital Signal Processing", vol. 36, No. 3, pp. 510-519, Aug. 1990.
Uomori et al., "Electronic Image Stabiliztion System For Video Cameras And VCRS", J. Soc. Motion Pict. Telev. Eng., vol. 101, pp. 66-75, 1992.
http://Slashdot.org/articles/07/09/06/1431217.html.

* cited by examiner

IMAGE PROCESSING OF AN INCOMING LIGHT FIELD USING A SPATIAL LIGHT MODULATOR

BACKGROUND OF THE INVENTION

The human eye is a remarkable instrument which uses many adaptive mechanisms to enable sight in many different lighting conditions. For example, the eye can see as well in dim rooms as in full sunlight which is approximately one million times as bright. And as another example, the eye can even see with reduced acuity in starlit nights at luminance levels approximately fourteen levels of magnitude less than full sunlight.

However, the instantaneous sensitivity of the human eye is far more limited. For example, at any moment the human eye can only perceive around 5 orders of magnitude of simultaneous contrast (equating to a luminance range or window of about 50,000:1 to 100,000:1), and as such, the human eye must shift its luminance window to adapt to new lighting conditions. Human vision is significantly impaired during large-scale adaptations which can take seconds or even minutes, thereby causing inconvenience and creating dangerous situations when driving automobiles or engaging in other dangerous activities.

Conventional solutions to the adaptation latency problems of the human eye have focused on reducing the maximum luminance level to which the window of perceivable contrast must be scaled. For example, many sunglasses and goggles have tinted layers which reduce the intensity of high-intensity light, thereby aiding sight in situations with more light. However, poorly-lit objects or scenes are also darkened by such glasses and goggles, which can increase the danger in certain situations. For example, ski or snowboard goggles can further reduce the brightness of shaded terrain features, which can lead to injury or even death due to miscalculation when maneuvering, unawareness of a given feature, or the like. Also, tinted sunglasses worn when driving on a sunny day may make shaded objects or portions of roadway harder to see, thereby leading to automobile damage and/or personal injury due to loss of control of the vehicle, collision, or the like.

SUMMARY OF THE INVENTION

Accordingly, a need exists to reduce the time required for the human eye to adjust to luminance changes in an incoming light field. Additionally, a need exists to reduce the brightness of higher-luminance objects without significantly reducing the brightness or contrast of objects with lower luminance of the same field of view. Embodiments of the present invention provide novel solutions to these needs and others as described below.

Embodiments of the present invention are directed to a method, computer-usable medium and a system for varying an incoming light field. More specifically, embodiments provide mechanisms for performing image processing on an incoming light field using a spatial light modulator (e.g., active filter, active discriminator, active matrix, active array, etc.) which is adjusted based upon characteristics of the incoming light field. The spatial light modulator may be positioned between the viewed scene (or image) and the eye, and therefore, may be semi-transparent. The image processing may consist of tone mapping (e.g., dynamically compressing the dynamic range of the incoming light field to enable the human eye to more quickly adjust to radiance or luminance changes), color enhancement (e.g., making certain colors more vibrant, increasing the saturation of certain colors, etc.), beautification (e.g., making one or more objects appear more aesthetically pleasing), edge enhancement (e.g., modifying an object outline), spectral separation of colors, separation of metamers, object emphasis, other image processing, or some combination thereof. Additionally, embodiments may compensate for parallax errors by adjusting the spatial light modulator based upon the position (e.g., location, orientation, etc.) of an observer (e.g., an observer's head, eyes, etc.) with respect to the spatial light modulator. And further, embodiments may be incorporated into optical devices (e.g., binoculars, microscopes, military observation equipment, etc.), wearable optical devices (e.g., glasses, sunglasses, motorcycle helmets, bicycle helmets, skiing/snowboarding helmets, etc.), windows, windshields, and the like, where the semi-transparent spatial light modulator adjusts the image before entering the eye.

In one embodiment, a method of varying an incoming light field includes detecting the incoming light field using an optical sensor, where the incoming light field includes a plurality of spatial radiometric attributes and impinges upon a semi-transparent spatial light modulator. A modulator setting is automatically determined for the spatial light modulator based upon the plurality of spatial radiometric attributes. The spatial light modulator is dynamically adjusted based upon the modulator setting to vary the incoming light field. The plurality of spatial radiometric attributes may include respective radiance values associated with respective spatial locations. Additionally, the plurality of radiometric attributes include respective wavelength composition values associated with respective spatial locations. The method may also include determining a parallax error associated with the incoming light field, modifying the modulator setting based upon the parallax error, and where the dynamically adjusting includes dynamically adjusting the spatial light modulator using the modified modulator setting to vary the incoming light field.

In another embodiment, a computer-usable medium has computer-readable program code embodied therein for causing a computer system to perform a method of varying an incoming light field, where the method includes detecting the incoming light field using an optical sensor, where the incoming light field includes a plurality of spatial radiometric attributes and impinges on a semi-transparent spatial light modulator. A modulator setting is automatically determined for the spatial light modulator based upon the plurality of spatial radiometric attributes. The spatial light modulator is dynamically adjusted based upon the modulator setting to vary the incoming light field. The plurality of spatial radiometric attributes may include respective radiance values associated with respective spatial locations. Additionally, the plurality of radiometric attributes include respective wavelength composition values associated with respective spatial locations. The method may also include determining a parallax error associated with the incoming light field, modifying the modulator setting based upon the parallax error, and where the dynamically adjusting includes dynamically adjusting the spatial light modulator using the modified modulator setting to vary the incoming light field.

And in another embodiment, a system for varying an incoming light field includes an optical sensor for detecting the incoming light field, where the incoming light field includes a plurality of spatial radiometric attributes. A first component is coupled to the optical sensor and for automatically determining a modulator setting for a spatial light modulator based upon the plurality of spatial radiometric attributes. A semi-transparent spatial light modulator is coupled to the component and is operable to dynamically vary the incoming light field based upon the modulator setting, and where the incoming light field impinges upon the spatial light modulator. The plurality of spatial radiometric attributes may include respective radiance values associated with respective spatial locations. Additionally, the plurality of radiometric attributes include respective wavelength composition values associated with respective spatial locations. The system may also include a second component for determining a parallax error associated with the incoming light field, wherein the first component is further operable to automatically modify the modulator setting based upon the parallax error, and wherein the spatial light modulator is further operable to dynamically vary the incoming light field based upon the modified modulator setting.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
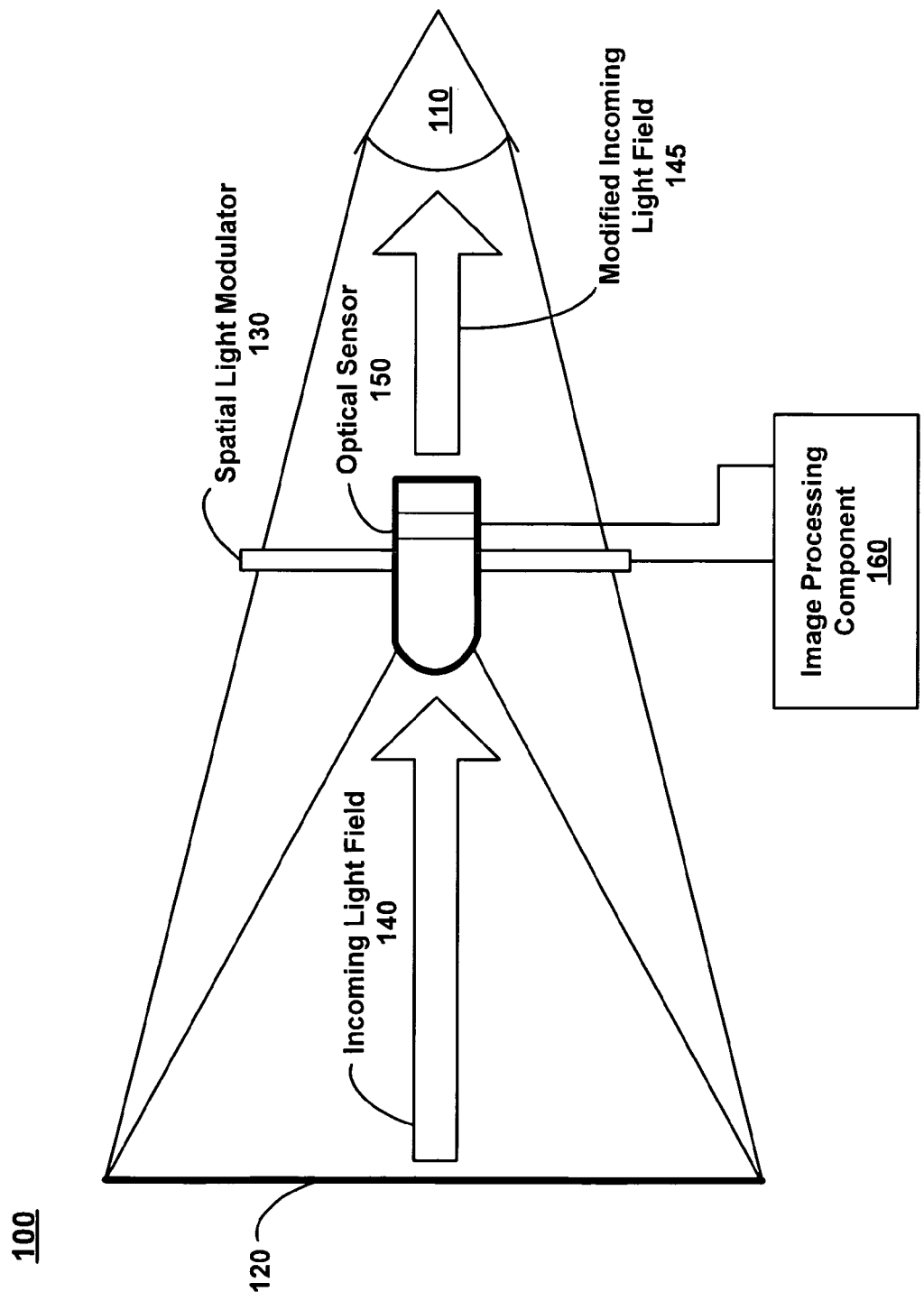
FIG. 1 shows an exemplary system for dynamically varying an incoming light field in accordance with one embodiment of the present invention.

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention is intended to cover alternatives, modifications, and equivalents which may be included with the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing the terms such as "accepting," "accessing," "adding," "adjusting," "analyzing," "applying," "assembling," "assigning," "calculating," "capturing," "combining," "comparing," "collecting," "creating," "defining," "depicting," "detecting," "determining," "displaying," "establishing," "executing," "generating," "grouping," "identifying," "initiating," "interacting," "modifying," "monitoring," "moving," "outputting," "performing," "placing," "presenting," "processing," "programming," "querying," "removing," "repeating," "sampling," "sorting," "storing," "subtracting," "tracking," "transforming," "using," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the Invention

FIG. 1 shows exemplary system 100 for dynamically varying an incoming light field in accordance with one embodiment of the present invention. As shown in FIG. 1, observer 110 may observe scene 120 through semi-transparent spatial light modulator 130, where scene 120 may be represented by incoming light field 140 and may comprise two-dimensional and/or three-dimensional objects. Observer 110 may comprise a human eye, an electrical and/or mechanical optical reception component (e.g., a still-image camera, moving-image camera, etc.), etc. Incoming light field 140 may be dynamically varied, modulated, or otherwise modified by spatial light modulator 130 such that modified incoming light field 145 is transmitted to observer 110 for viewing. Variation of incoming light field 140 may be controlled by image processing component 160 using input (e.g., an analog and/or digital signal representing incoming light field 140) from optical sensor 150 to dynamically generate an output signal (e.g., comprising one or more modulator settings) for adjusting spatial light modulator 130. As such, embodiments provide convenient and effective system for performing dynamic image processing of incoming light field 140 (e.g., based upon changes in incoming light field 140 detected by sensor 150) to generate modified incoming light field 145 for viewing by an observer (e.g., 110).

Incoming light field 140 comprises multiple spatial radiometric attributes which may be detected by sensor 150 and used by component 160 to perform dynamic image processing of incoming light field 140 (e.g., by determining and outputting modulator settings to modulator 130). Spatial radiometric attributes may comprise portions of detectable or measurable optical radiation which are spaced apart from one another. The optical radiation of the spatial radiometric attributes may comprise electromagnetic radiation within the approximate frequency range of $3 \times 10^{11}$ and $3 \times 10^{16}$ Hz (e.g., comprising the ultraviolet, visible, and/or infrared spectrums) in one embodiment. As such, embodiments further enable spatial dynamic image processing of incoming light field 140, thereby enabling spatial light modulator 130 to dynamically vary or modify different areas or portions of scene 120 (e.g., as represented by incoming light field 140) independently from one another (e.g., in response to changes in incoming light field 140 detected by sensor 150).

As shown in FIG. 1, sensor 150 may comprise any sensor capable of detecting radiance or luminance information, wavelength composition or wavelength decomposition information, other optical information (e.g., of visible light, light outside the visible spectrum such as ultraviolet or infrared light, etc.), or some combination thereof, from incoming light field 140. Additionally, sensor 150 may detect changes in the optical information (e.g., radiance, wavelength composition, etc.) associated with the incoming light field (e.g., 140), which may then be used to perform the image processing (e.g., dynamically, spatially, etc.) to generate the modified incoming light field (e.g., 145). In one embodiment, sensor 150 may comprise a camera for capturing still and/or moving images.

Sensor 150 may be located physically near or around modulator 130 (e.g., to reduce the distance between a central axis of incoming light field 140) to detect incoming light field 140 with reduced distortion, parallax error, etc. in one embodiment. Alternatively, sensor 150 may be located further away from modulator 130 (and consequently from the central axis of incoming light field 140), where the offset of sensor 150 may be compensated for (e.g., by sensor 150 before communicating the optical information to component 160, during image processing by component 160, etc.) to reduce distortion, parallax error, etc.

Alternatively, sensor 150 may detect a portion of modified incoming light field 145 reflected off observer 110 or off another surface introduced into modified incoming light field 145 (e.g., a half-silvered mirror, etc.). For example, where observer 110 is a human eye, sensor 150 may be directed at the eye and detect the portion of modified incoming light field 145 reflected off the cornea or other portion of the eye (e.g., retina, etc.). As such, sensor 150 may detect changes in modified incoming light field 145 much the same way it would detect changes in incoming light field 140, thereby enabling image processing (e.g., dynamic, spatial, etc.) as discussed above.

As shown in FIG. 1, spatial light modulator 130 may comprise any component capable of passing light, which may be adjusted (e.g., using modulator settings) to vary or modify the passage of the light (e.g., by filtering, polarization, etc.). Additionally, modulator 130 may be capable of spatially filtering incoming light field 140 by adjusting one portion of the modulator independent of another. Modulator 130 may comprise an active filter, active discriminator, active matrix, active array, or the like, in one embodiment. Modulator 130 may adjust the radiance of incoming light field 140 (or portions thereof). Modulator 130 may adjust the wavelength composition (e.g., by filtering certain wavelengths or ranges of wavelengths) of incoming light field 140 (or portions thereof). And in another embodiment, modulator 130 may comprise a liquid crystal display (LCD) element capable of controlling the amount of light passed as well as the approximate range of wavelengths passed, where various portions of the LCD element (e.g., pixels or groups of pixels) may be controlled independent of others.

Component 160 may comprise hardware and/or software capable of generating modulator settings for adjusting or controlling modulator 130 in response to an input representing characteristics or attributes (e.g., spatial radiometric attributes) of incoming light field 140 (e.g., detected or measured by optical sensor 150). The image processing performed by component 160 may comprise tone mapping in one embodiment. Tone mapping involves decreasing the radiance of higher-radiance objects to compress the dynamic range of the incoming light field (e.g., by reducing the radiance of higher-radiance objects), which can enable the human eye to more quickly adjust to radiance changes. In one embodiment, the amount of filtering (e.g., to decrease radiance) applied to the incoming light field (e.g., 140) may be proportional to the magnitude of the radiance of a given portion of a scene.

Figure 2A:
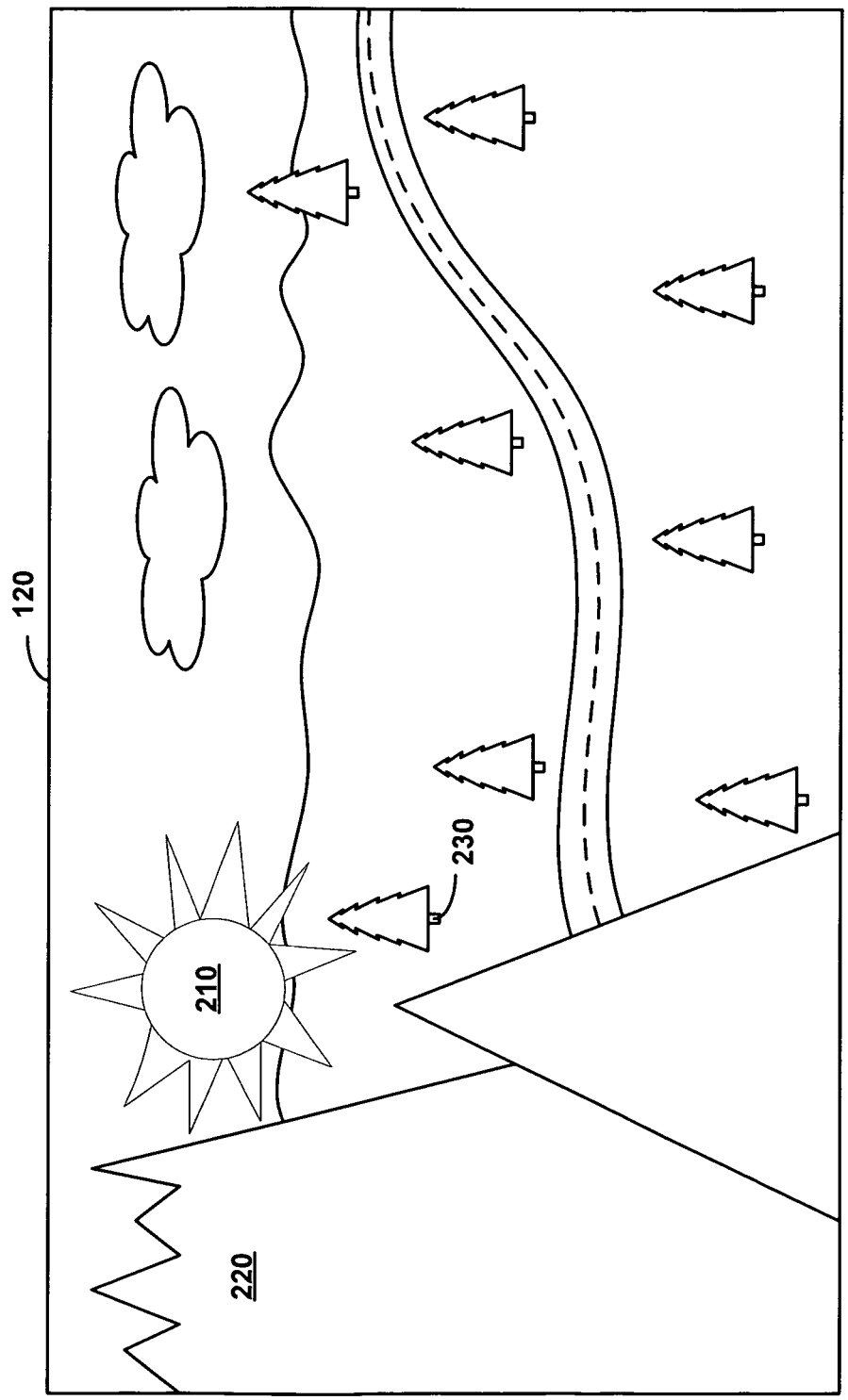
FIG. 2A shows an exemplary scene prior to tone mapping in accordance with one embodiment of the present invention.
Figure 2B:
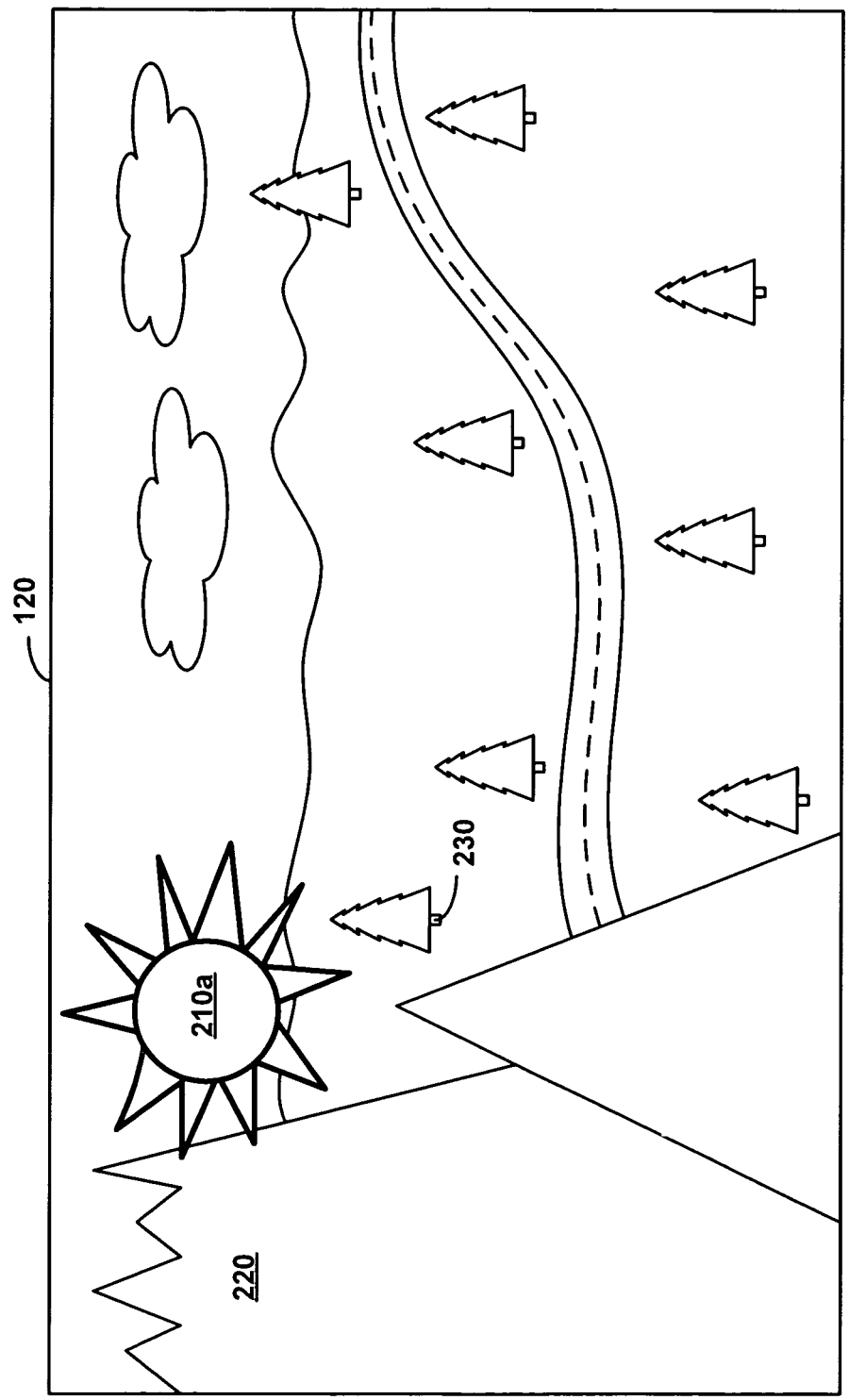
FIG. 2B shows an exemplary scene after tone mapping in accordance with one embodiment of the present invention.

FIGS. 2A and 2B illustrate exemplary tone mapping in accordance with embodiments of the present invention. For example, FIG. 2A shows exemplary scene 120 prior to tone mapping, whereas FIG. 2B shows exemplary scene 120 after tone mapping. As shown in FIG. 2A, sun 210 has a higher radiance value compared with mountain 220 and tree 230. As such, sun 210 can temporarily impair vision while the eye adapts, as well as reduce the ability of the eye to distinguish objects (e.g., mountain 220, tree 230, etc.) with lower radiance once it adjusts to the higher radiance of sun 210. However, the spatial dynamic image processing of system 100 enables the radiance of sun 210 to be reduced (e.g., as depicted by sun 210a in FIG. 2B) without significantly affecting the radiance of other graphical objects within scene 120. Thus, the dynamic range of the objects within scene 120 is reduced to enable quicker adaptation of the eye while improving the ability of the eye to distinguish objects (e.g., mountain 220, tree 230, etc.) with lower radiance.

As shown in FIG. 1, component 160 may also perform color enhancement (e.g., making certain colors more vibrant, increasing the saturation of certain colors, etc.) and/or beautification (e.g., making one or more objects appear more aesthetically pleasing). Edge enhancement (e.g., modifying an object outline), spectral separation of colors (e.g., making one color stand out from another color), spectral separation of metamers (e.g., making one metamer stand out from another metamer), object emphasis, and other image processing may also be performed by component 160. And in other embodiments, component 160 may perform multiple forms of image processing discussed above.

Although FIG. 1 depicts component 160 as a single unit, it should be appreciated that component 160 may be distributed among more than one component in other embodiments. Although FIG. 1 depicts modulator 130 and sensor 150 with a specific size, positioning, etc., it should be appreciated that modulator 130 and sensor 150 may be alternatively sized, positioned, etc. in other embodiments. Additionally, although scene 120 is depicted in FIG. 1 by a thin and straight line for simplicity, it should be appreciated that scene 120 may represent three-dimensional objects of various sizes, depths, etc. And further, although FIG. 1 depicts only one modulator (e.g., 130), it should be appreciated that multiple modulators (e.g., active and/or non-active) and/or other components may be used/controlled in other embodiments.

Figure 3:
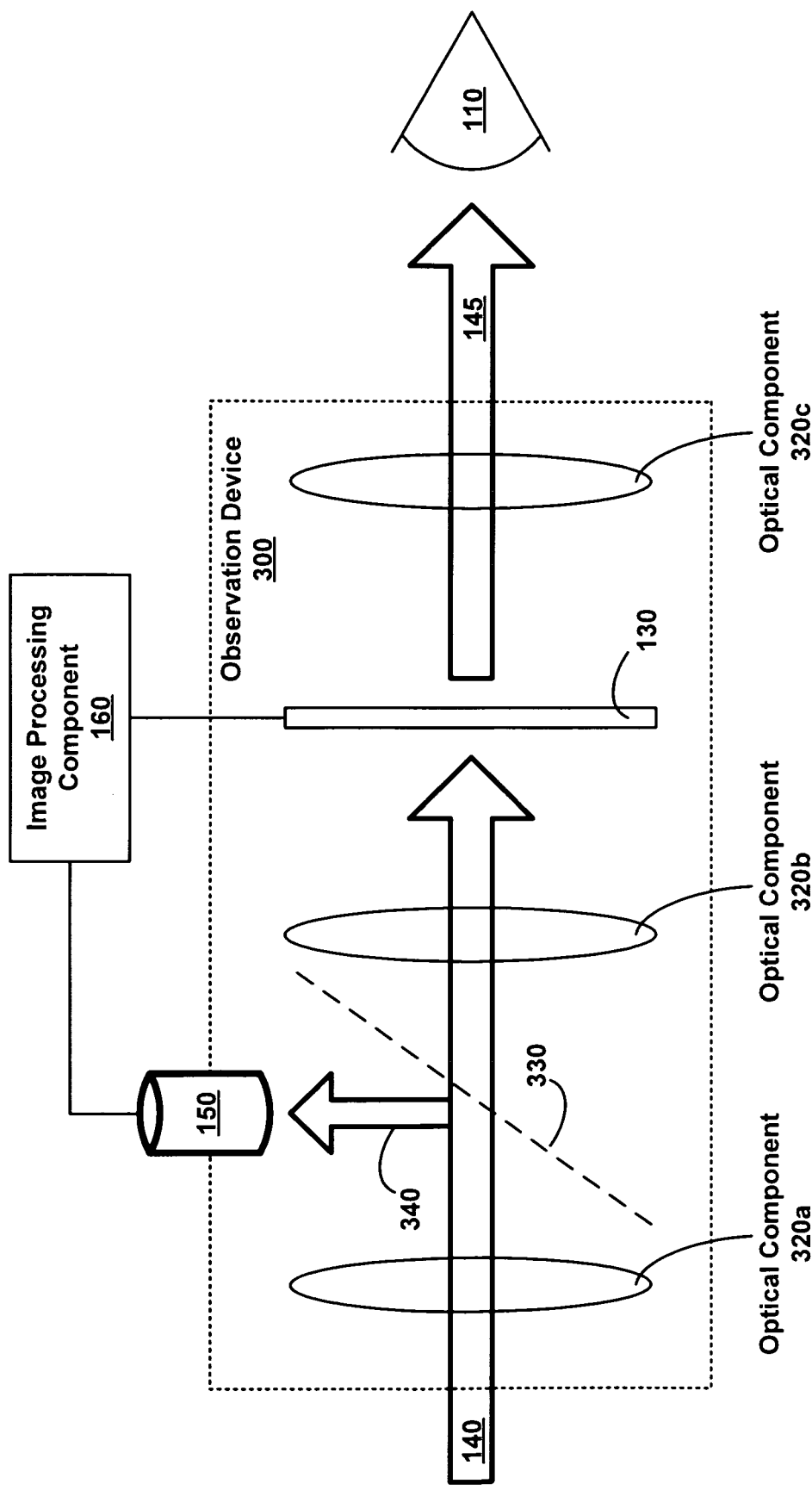
FIG. 3 shows an exemplary observation device for varying an incoming light field in accordance with one embodiment of the present invention.

FIG. 3 shows exemplary observation device 300 for varying an incoming light field in accordance with one embodiment of the present invention. As shown in FIG. 3, spatial light modulator 130 is located within device 300 such that light (e.g., incoming light field 140) entering device 300 can be modulated prior to exiting device 300 (e.g., as modified incoming light field 145). The light may also pass through one or more optical components (e.g., 320a-320c) within device 300, where the optical components may comprise modulators, diffusers, prisms, lenses, other optical components, or some combination thereof. Additionally, device 300 comprises reflective component 330 for reflecting incoming light field 140 to generate reflected incoming light field 340. As such, optical sensor 150 may detect or measure incoming light field 340 to enable image processing (e.g., dynamic, spatial, etc.) on incoming light field 140 as discussed above with respect to FIG. 1.

Reflective component 330 may comprise any material capable of reflecting a portion of the incident light (e.g., incoming light field 140) and passing a portion of the incident light. In one embodiment, component 330 may comprise a half-silvered mirror or beam splitter. As such, component 330 may generate reflected incoming light field 340 by reflection while passing at least a portion of incoming light field 140 toward spatial light modulator 130.

Device 300 may comprise a pair of binoculars, a microscope, military observation equipment, a wearable optical device (e.g., glasses, sunglasses, motorcycle helmets, bicycle helmets, skiing/snowboarding helmets, etc.), or other optical device. Additionally, device 300 may comprise one or more eye-locating or eye-fixating features and/or optical characteristics which locate and/or orient an observer's eye with respect to modified incoming light field 145, thereby reducing the parallax error caused by movement of the head and/or eyes with respect to the device (e.g., 300). For example, device 300 may comprise an eye-locating or eye-fixating feature (not shown in FIG. 3) such as an eye cup, nose bridge, head strap, etc. In another embodiment, device 300 may comprise optical characteristics (e.g., produced by optical components 320a-320c) which encourage a fixed eye position, thereby reducing eye movement with respect to modified incoming light field 145.

Although FIG. 3 shows device 300 with three optical components (e.g., 320a-320c), it should be appreciated that device 300 may comprise a larger or smaller number in other embodiments. Although sensor 150 is depicted partially within and partially outside device 300, it should be appreciated that sensor 150 may be alternatively located (e.g., inside device 300, outside device 300, etc.) in other embodiments. Additionally, although image processing component 160 is depicted outside device 300 in FIG. 3, it should be appreciated that component 160 may be alternatively located (e.g., inside device 300, etc.) in other embodiments.

Figure 4:
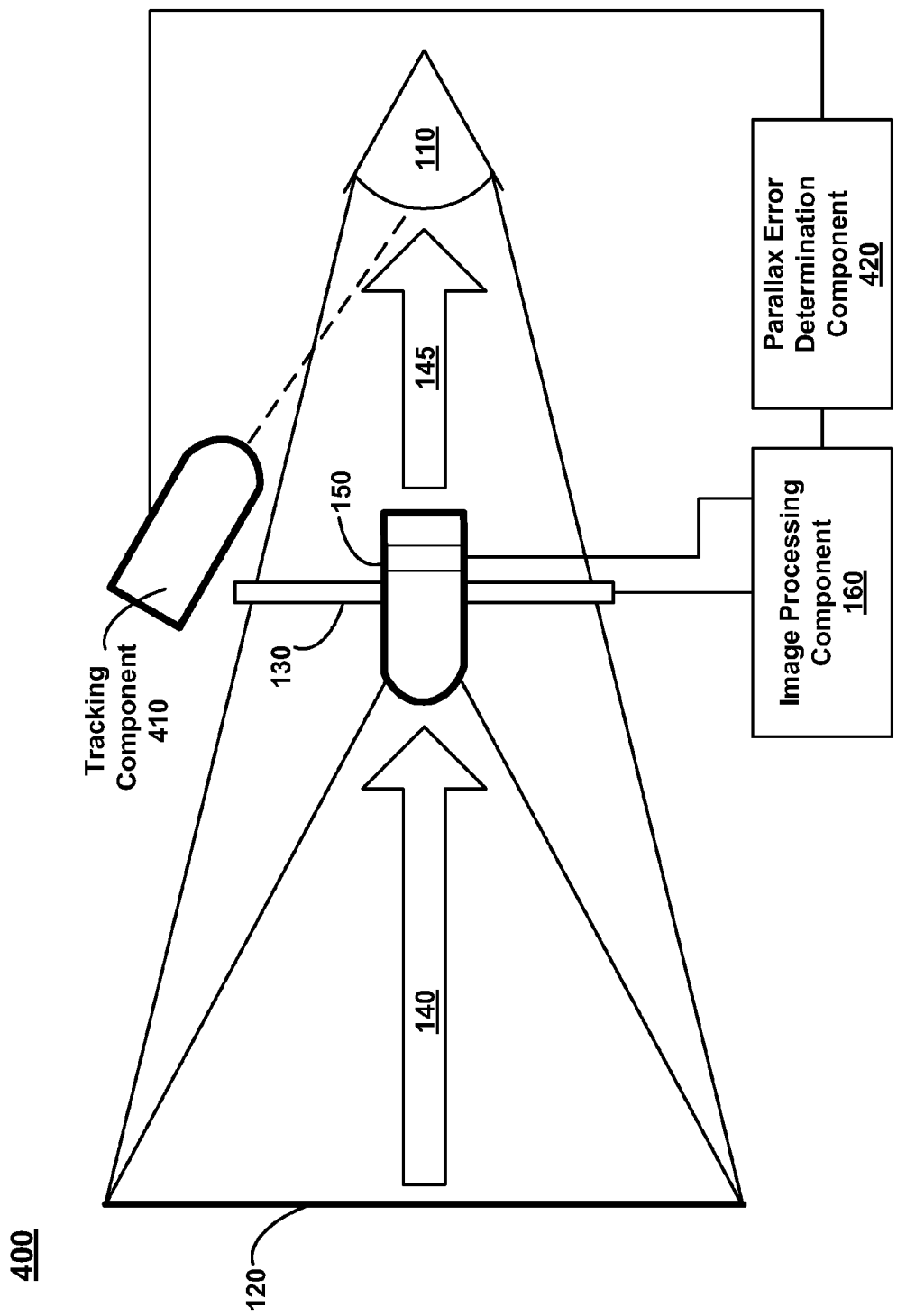
FIG. 4 shows an exemplary system for varying an incoming light field with parallax error compensation in accordance with one embodiment of the present invention.

FIG. 4 shows exemplary system 400 for varying an incoming light field with parallax error compensation in accordance with one embodiment of the present invention. As shown in FIG. 4, system 400 comprises tracking component 410 for tracking a feature (e.g., head, eye, etc.) of observer 110 and outputting tracking information to parallax error determination component 420. Component 420, which may comprise hardware and/or software, may then determine a parallax error associated with the incoming light field and communicate information regarding the parallax error to image processing component 160. Thereafter, component 160 may perform image processing on the incoming light field 140 using input from sensor 150 (e.g., as discussed above with respect to FIG. 1) and parallax error information from component 420. In one embodiment, component 160 may generate a modulator setting based upon input from sensor 150 and input (e.g., parallax error information) from component 420. In another embodiment, component 160 may modify a determined modulator setting using the parallax error information from component 420. As such, spatial image processing may be performed on the incoming light field (e.g., 140) which compensates for parallax error resulting from movement of a feature (e.g., head, eye, etc.) of observer 110. Moreover, component 420 may output updated parallax error information, and thus, system 400 may perform dynamic image processing based upon changes in scene 120 as well as changes in the position (e.g., location, orientation, etc.) of observer 110.

In one embodiment, tracking component 410 may be used to perform an initial calibration of system 400. As such, a determined parallax error may be applied (e.g., for a predetermined time, until another parallax error determination is performed, until system reset, etc.) to the spatial image processing performed by component 160. Alternatively, tracking component 410 may be used to dynamically calibrate the system by periodically performing parallax error updates (e.g., during operation of system 400).

Although FIG. 4 depicts component 420 as a single unit, it should be appreciated that component 420 may be distributed amongst more than one component in other embodiments. Although FIG. 4 depicts tracking component 410 with a specific size, positioning, etc., it should be appreciated that component 410 may be alternatively sized, positioned, etc. in other embodiments. Additionally, although FIG. 4 depicts only one tracking component (e.g., 410), it should be appreciated that multiple tracking components may be used in other embodiments.

Figure 5:
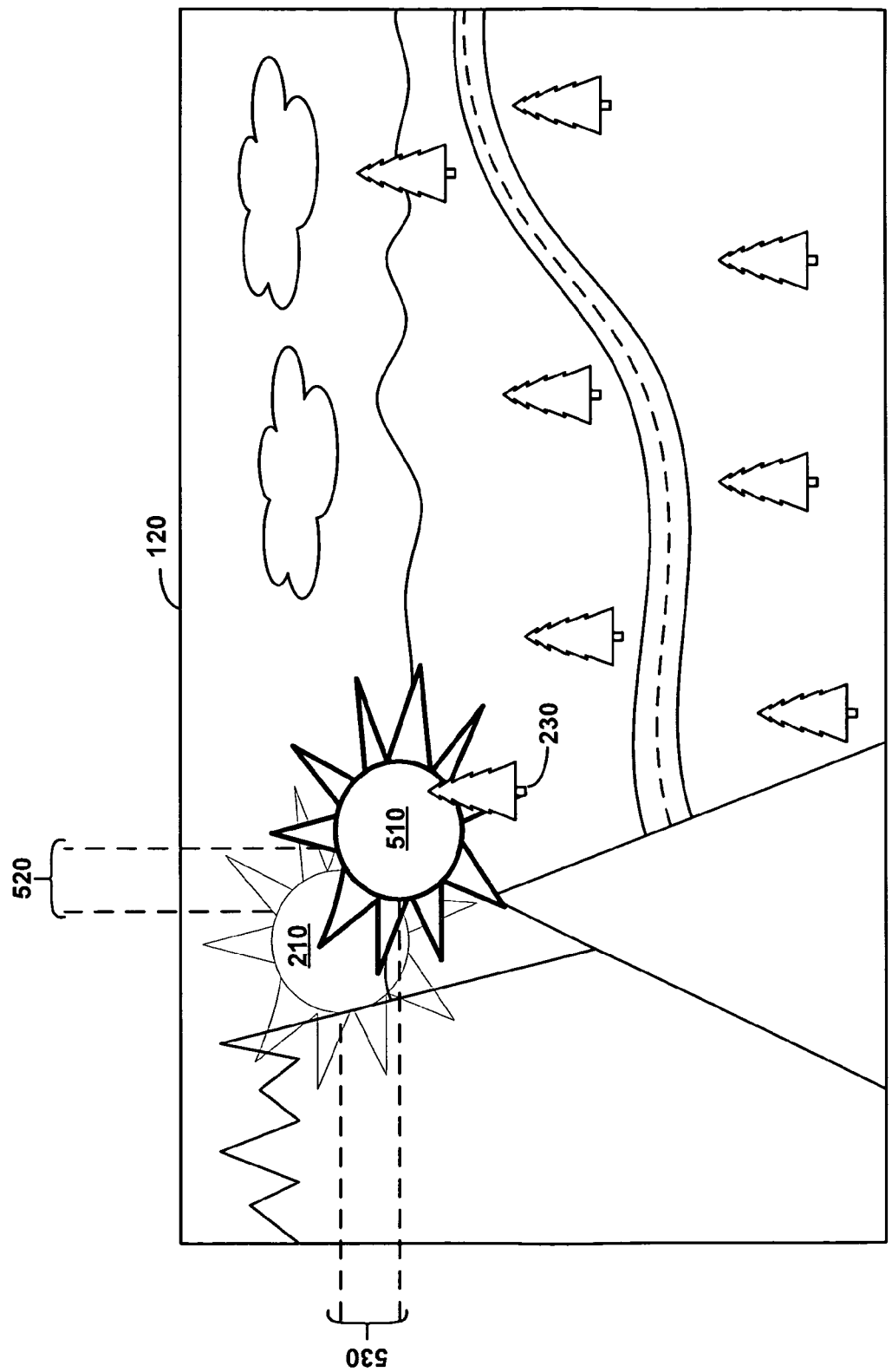
FIG. 5 shows exemplary parallax error compensation for a tone mapping of an exemplary scene in accordance with one embodiment of the present invention.

FIG. 5 shows exemplary parallax error compensation for a tone mapping of exemplary scene 120 in accordance with one embodiment of the present invention. As shown in FIG. 5, tone mapping object or effect 510 may be generated in response to detected spatial radiometric attributes of sun 210 (e.g., having higher radiance than other objects in scene 120). However, parallax error may be introduced (e.g., by movement of an observer with respect to the spatial light modulator generating the tone mapping) which offsets effect 510 such that it does not align with sun 210. However, systems with parallax error compensation capabilities (e.g., system 400) may compensate for this parallax error and change the position of the tone mapping effects (e.g., 510) such that they align with respective features (e.g., sun 210) of the scene (e.g., 120). For example, the parallax error producing the misalignment of effect 510 with sun 210 as shown in FIG. 5 may be compensated for by shifting effect 510 to the left by distance 520 and upward by distance 530.

In one embodiment, different effects corresponding to different features of scene 120 may be shifted different distances. For example, while effect 510 corresponding to sun 210 may be shifted by distances 520 and 530, an effect (not shown in FIG. 5) corresponding to tree 230 may be shifted by one or more distances which differ from distance 520 and/or distance 530. The respective amount by which each effect is shifted may be determined by the respective distance of each effect from one or more system components (e.g., of system 100, observation device 300, system 400, etc.). In one embodiment, effects corresponding to features located closer to system components may be shifted by larger distances than effects corresponding to features located further from system components. Alternatively, an effect may be shifted in multiple passes until the overlap of the effect (e.g., 510) and the feature (e.g., sun 210) is reduced and/or eliminated.

Figure 6:
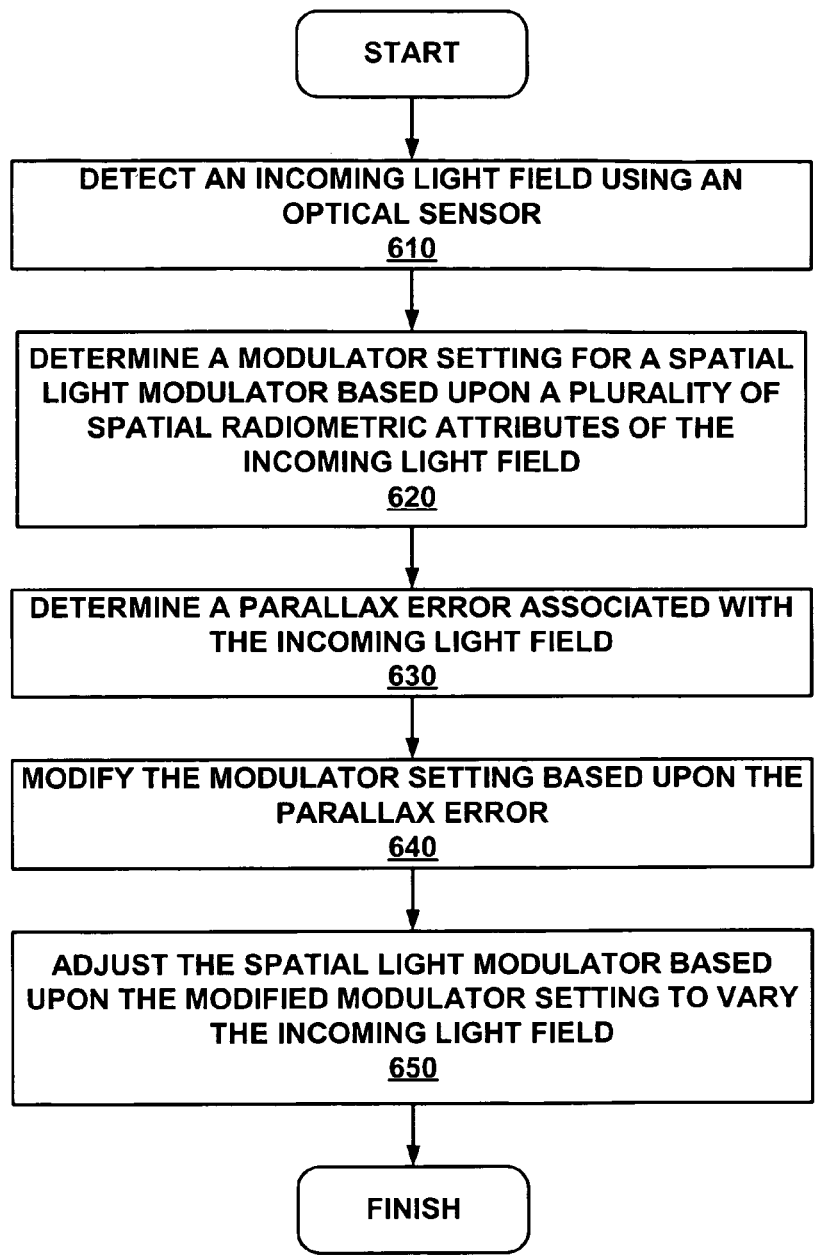
FIG. 6 shows an exemplary computer-implemented process for dynamically varying an incoming light field in accordance with one embodiment of the present invention.

FIG. 6 shows exemplary computer-implemented process 600 for dynamically varying an incoming light field in accordance with one embodiment of the present invention. As shown in FIG. 6, step 610 involves detecting an incoming light field using an optical sensor. The incoming light field (e.g., 140) may comprise light representing a scene (e.g., 120), and may be detected or measured by an optical sensor similar to optical sensor 150 described above. Additionally, the sensor (e.g., 150) may detect one or more spatial radiometric attributes (e.g., portions of detectable or measurable optical radiation which are spaced apart from one another) of the incoming light field (e.g., 140) in one embodiment.

Step 620 involves determining a modulator setting (e.g., an active matrix image) for a spatial light modulator (e.g., 130) based upon a plurality of spatial radiometric attributes of the incoming light field (e.g., 140). For example, where tone mapping of the scene is desired, the incoming light field may be sub-divided into portions such that a radiance value may be determined for each portion (e.g., using the information determined in step 610). In one embodiment, the portions with higher radiance may be assigned a stronger or higher respective modulator setting than portions with lower radiance, thereby darkening the higher-radiance portions more than the portions with lower radiance and compressing the dynamic range of a modified incoming light field (e.g., 145). Alternatively, where another type of image processing (e.g., color enhancement, beautification, edge enhancement, spectral separation of colors, spectral separation of metamers, object emphasis, etc.) is desired, the portions may be assigned respective modulator settings to carry out the image processing based upon detected attributes of the incoming light field (e.g., 140). Thus, the plurality of respective modulator settings for each portion may make up the combined modulator setting for the spatial light modulator (e.g., 130) in one embodiment.

As shown in FIG. 6, step 630 involves determining a parallax error associated with the incoming light field. The parallax error may result from movement of an observer's (e.g., 110) head, eye, or other feature with respect to the spatial light modulator. In one embodiment, the parallax error may be determined by a system (e.g., 400) as described above with respect to FIG. 4. Additionally, step 630 may be performed in accordance with process 700 of FIG. 7 in one embodiment.

The modulator setting determined in step 620 may then be modified in step 640 based upon the parallax error determined in step 630. For example, where the parallax error is determined to shift an applied modulator setting by a certain amount (e.g., exemplary distances 520 and 530 of FIG. 5), then the applied modulator settings may be adjusted (e.g., offset with respect to the modulator) to compensate for the parallax error.

As shown in FIG. 6, step 650 involves adjusting a spatial light modulator (e.g., 130) based upon the modified modulator setting to vary the incoming light field (e.g., 140) and generate a modified incoming light field (e.g., 145). The modified modulator setting may be applied to the spatial light modulator (e.g., 130) in step 650. It should be appreciated that the modified modulator setting may comprise a modulator setting with parallax error compensation where such compensation is made. Alternatively, where parallax error compensation is not made, then the modulator may be adjusted based upon a modulator setting such as that determined in step 620. Additionally, it should be appreciated that the modulator settings and/or parallax error information may be updated or refreshed periodically, thereby enabling dynamic image processing which is capable of responding to changes in the incoming light field (e.g., 140).

Although FIG. 6 depicts an ordering for the steps of process 600, it should be appreciated that the steps may be performed in a different order and/or with one or more steps omitted in other embodiments. For example, after detecting an incoming light field (e.g., as in step 610) and determining a parallax error associated with the incoming light field (e.g., as in step 630), a modulator setting for a spatial light modulator may be determined based upon a plurality of spatial radiometric attributes of the incoming light field and the determined parallax error associated with the incoming light field. Thereafter, the spatial light modulator may be adjusted based upon the determined modulator setting to vary the incoming light field (e.g., similar to step 650), thereby omitting step 640.

Figure 7:
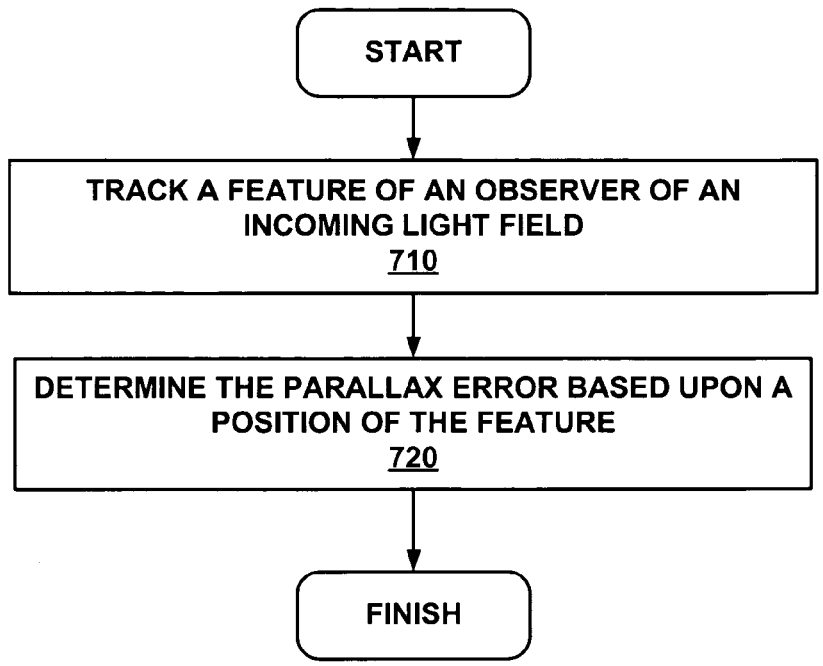
FIG. 7 shows an exemplary computer-implemented process for determining a parallax error associated with an incoming light field in accordance with one embodiment of the present invention.

FIG. 7 shows exemplary computer-implemented process 700 for determining a parallax error associated with an incoming light field in accordance with one embodiment of the present invention. As shown in FIG. 7, step 710 involves tracking a feature of an observer of an incoming light field (e.g., 140, 145, etc.). The tracked feature may comprise a head, eye, or other feature of an observer (e.g., 110). Additionally, a tracking component (e.g., 410 of FIG. 4) may be used to follow or track one or more features of an observer (e.g., 110) in one embodiment. Further, the position of the feature may be determined in step 710, where the position may comprise the location, orientation, or other attribute of the feature at any given time.

Step 720 involves determining a parallax error based upon a position of the feature. In one embodiment, the parallax error may be determined from a lookup table or other resource which may be indexed based upon the position of the feature to return or provide the associated parallax error for the input position. In another embodiment, calculations may be performed using the position of the feature and its location with respect to the modulator (e.g., 130) to determine the parallax error associated with feature's position.

Figure 8B:
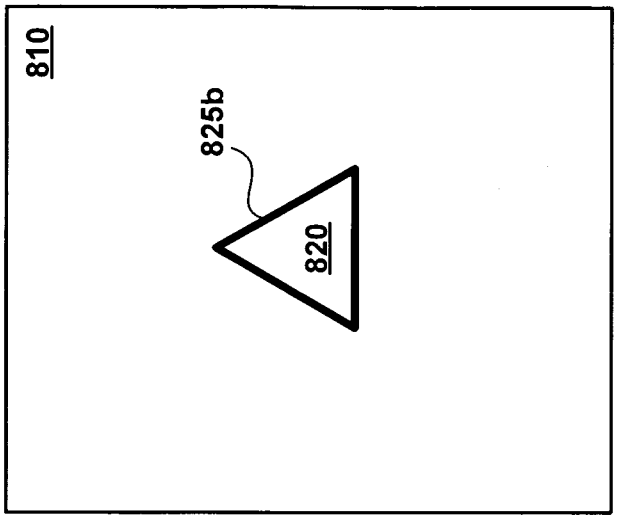
FIG. 8B shows an exemplary object after edge enhancement in accordance with one embodiment of the present invention.
Figure 8A:
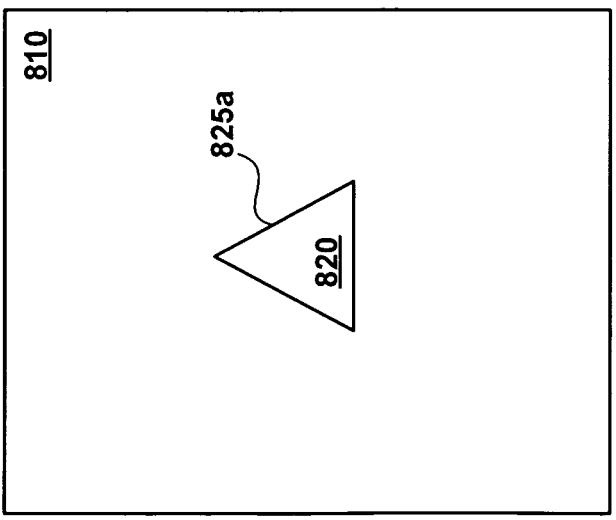
FIG. 8A shows an exemplary object before edge enhancement in accordance with one embodiment of the present invention.

FIG. 8A shows an exemplary object before edge enhancement in accordance with one embodiment of the present invention, whereas FIG. 8B shows an exemplary object after edge enhancement in accordance with one embodiment of the present invention. Edge enhancement involves modifying one or more portions of an object outline. For example, as shown in FIG. 8A, object 820 is positioned on background 810 with relatively thin edges 825*a*. However, edge enhancement may be performed on object 820 to provide higher contrast edges as depicted in FIG. 8B by thicker edges 825*b*. As such, embodiments enable edge enhancement of identified objects (e.g., 820) by varying the incoming light field (e.g., 140). In one embodiment, the edges of object 820 may be enhanced by using a spatial light modulator (e.g., 130) to decrease the radiance of the portions surrounding object 820, thereby creating a darker band around object 820.

Figure 9B:
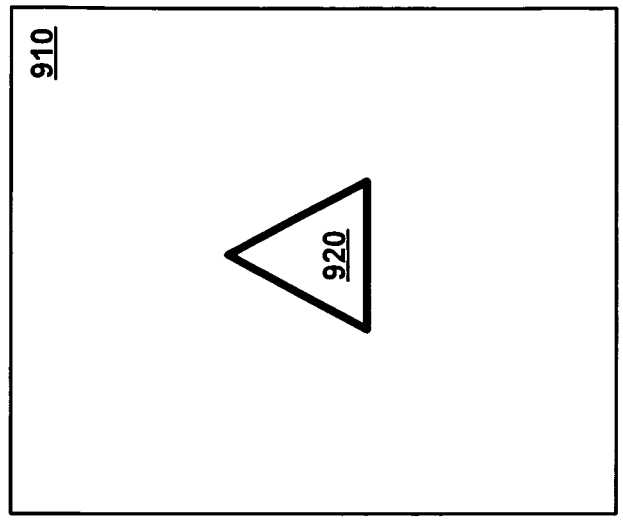
FIG. 9B shows an exemplary object after spectral separation of colors in accordance with one embodiment of the present invention.
Figure 9A:
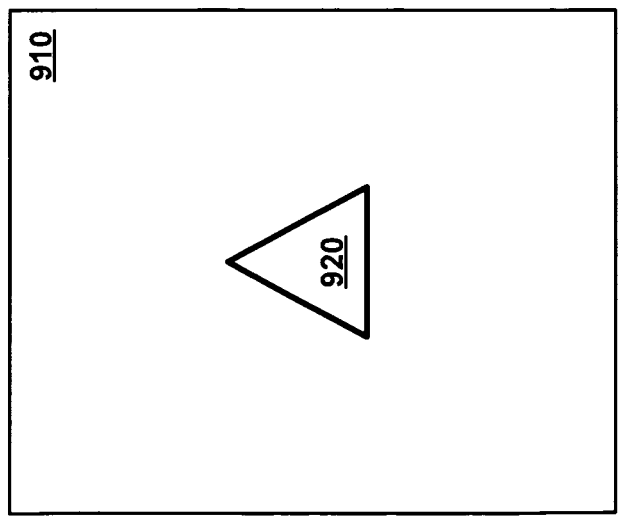
FIG. 9A shows an exemplary object before spectral separation of colors in accordance with one embodiment of the present invention.

FIG. 9A shows an exemplary object before spectral separation of colors in accordance with one embodiment of the present invention, whereas FIG. 9B shows an exemplary object after spectral separation of colors in accordance with one embodiment of the present invention. Spectral separation of colors involves making one color stand out from another color. For example, as shown in FIG. 9A, object 920 comprises a different color than background 910. However, spectral separation of colors may be performed on object 920 and/or background 910 to make object 920 stand out from background 910 (e.g., by changing the color of object 920 and/or background 910, by increasing the contrast of object 920 with respect to background 910, etc.) as depicted in FIG. 9B. As such, embodiments enable spectral separation of colors associated with identified objects (e.g., 920) by varying the incoming light field (e.g., 140). In one embodiment, object 920 may be modulated to change its color and/or radiance using a spatial light modulator (e.g., 130). In another embodiment, background 910 may be modulated to change its color and/or radiance using a spatial light modulator (e.g., 130).

Figure 10B:
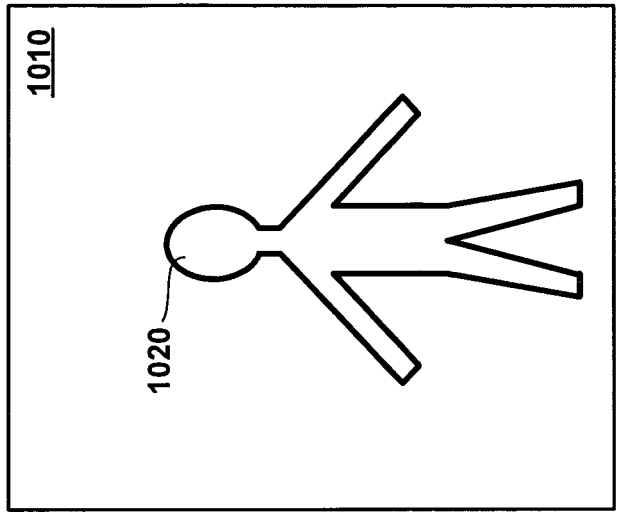
FIG. 10B shows an exemplary object after spectral separation of metamers in accordance with one embodiment of the present invention.
Figure 10A:
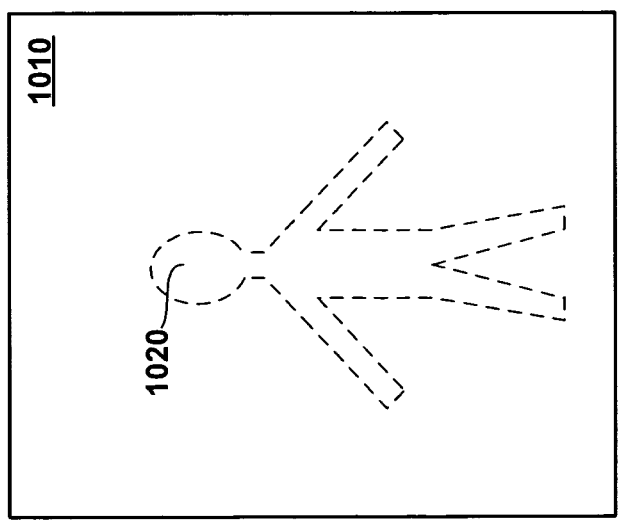
FIG. 10A shows an exemplary object before spectral separation of metamers in accordance with one embodiment of the present invention.

FIG. 10A shows an exemplary object before spectral separation of metamers in accordance with one embodiment of the present invention, whereas FIG. 10B shows an exemplary object after spectral separation of metamers in accordance with one embodiment of the present invention. Spectral separation of metamers (e.g., two colors that appear similar but have different spectral compositions) involves making one metamer stand out from another metamer. For example, as shown in FIG. 10A, object 1020 comprises a first metamer which appears as a similar color to a second metamer of background 1010. However, spectral separation of metamers may be performed on object 1020 and/or background 1010 to make object 1020 stand out from background 1010 (e.g., by altering the spectral composition of either object 1020 and/or background 1010) as depicted in FIG. 10B. As such, embodiments enable spectral separation of metamers associated with identified objects (e.g., 1020) by varying the incoming light field (e.g., 140).

Spectral separation of metamers may be performed by filtering object 1020 and/or background 1010 (e.g., using modulator 130, etc.) to alter the spectral composition of each metamer, thereby making them appear as different colors, shades of colors, levels of grayscale, etc. In one embodiment, a bandpass modulator may be applied to object 1020 and background 1010 (e.g., using modulator 130) to narrow the spectral composition of each metamer to a range in which one metamer can be distinguished from another. Thus, embodiments may be used in military applications for detecting camouflaged objects (e.g., where the surrounding terrain or background is of a different metamer than the camouflaged object), as well as other applications requiring metamer separation.

Figure 11B:
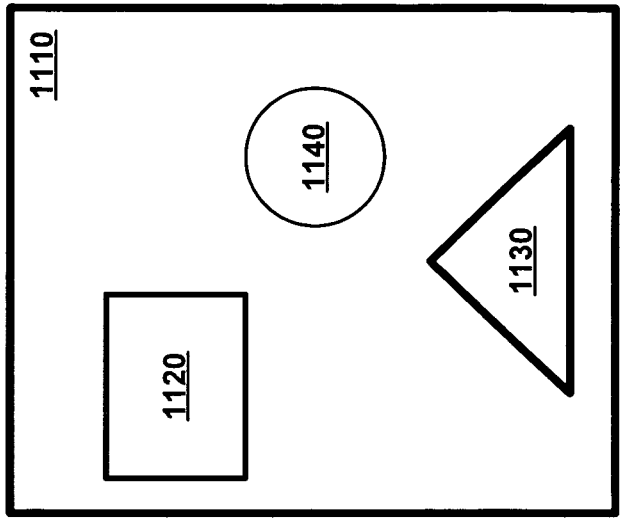
FIG. 11B shows an exemplary object after object emphasis in accordance with one embodiment of the present invention.
Figure 11A:
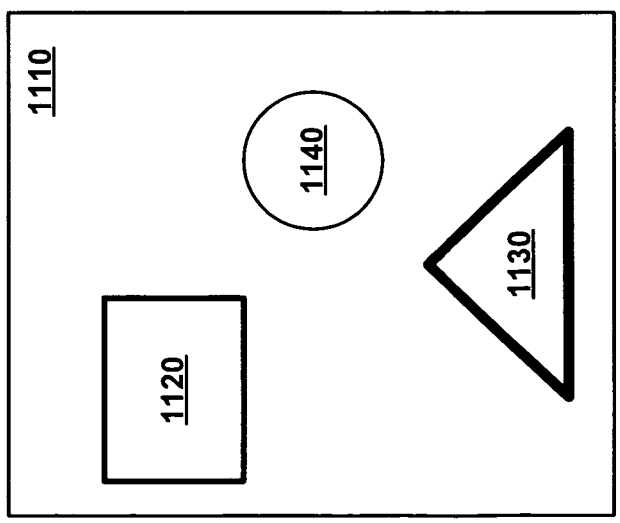
FIG. 11A shows an exemplary object before object emphasis in accordance with one embodiment of the present invention.

FIG. 11A shows an exemplary object before object emphasis in accordance with one embodiment of the present invention, whereas FIG. 11B shows an exemplary object after object emphasis in accordance with one embodiment of the present invention. As shown in FIG. 11A, objects 1120-1140 are arranged on background 1110. However, object emphasis may be performed on objects 1120-1140 and/or background 1110 to make one or more of the objects (e.g., 1120) stand out from the other objects (e.g., 1130 and 1140) and/or background 1110 as depicted in FIG. 11B. As such, embodiments enable object emphasis of identified objects (e.g., 1120) by varying the incoming light field (e.g., 140) using an optical modulator (e.g., 130) in one embodiment.

Although objects 1130-1140 and background 1110 are shaded in FIG. 11B to make object 1120 stand out, it should be appreciated that other image processing may be performed to emphasize objects. For example, the colors of non-emphasized objects (e.g., 1130-1140) and/or the background (e.g., 1110) may be modulated or changed to a grayscale while the emphasized object (e.g., 1120) remains unchanged. In other embodiments, other image processing may be performed to alter the color, radiance, or other optical characteristic of the emphasized object, non-emphasized objects, background, or some combination thereof.

Figure 12:
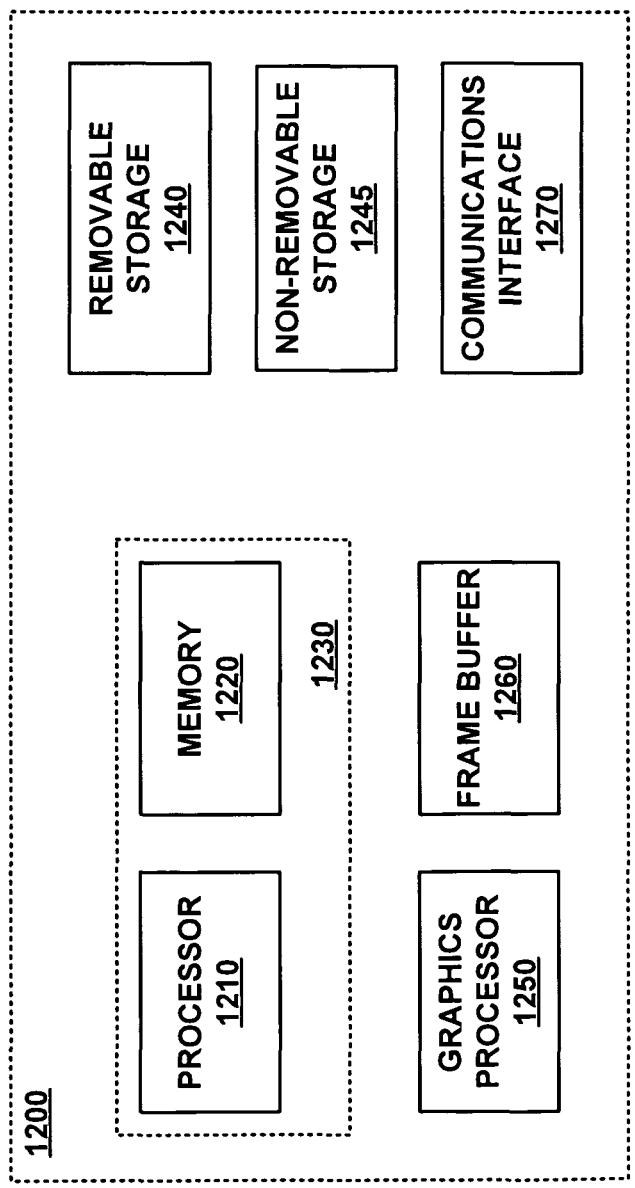
FIG. 12 shows an exemplary computer system platform upon which embodiments of the present invention may be implemented.

FIG. 12 shows exemplary computer system platform 1200 upon which embodiments of the present invention may be implemented. As shown in FIG. 12, portions of the present invention are comprised of computer-readable and computer-executable instructions that reside, for example, in computer system platform 1200 and which may be used as a part of a general purpose computer network (not shown). It is appreciated that computer system platform 1200 of FIG. 12 is merely exemplary. As such, the present invention can operate within a number of different systems including, but not limited to, general-purpose computer systems, embedded computer systems, laptop computer systems, hand-held computer systems, portable computer systems, stand-alone computer systems, or game consoles.

In one embodiment, depicted by dashed lines 1230, computer system platform 1200 may comprise at least one processor 1210 and at least one memory 1220. Processor 1210 may comprise a central processing unit (CPU) or other type of processor. Depending on the configuration and/or type of computer system environment, memory 1220 may comprise volatile memory (e.g., RAM), non-volatile memory (e.g., ROM, flash memory, etc.), or some combination of the two. Additionally, memory 1220 may be removable, non-removable, etc.

In other embodiments, computer system platform 1200 may comprise additional storage (e.g., removable storage 1240, non-removable storage 1245, etc.). Removable storage 1240 and/or non-removable storage 1245 may comprise volatile memory, non-volatile memory, or any combination thereof. Additionally, removable storage 1240 and/or non-removable storage 1245 may comprise CD-ROM, digital versatile disks (DVD) or other optical storage, magnetic cassettes, magnetic tape, magnetic disk storage or other magnetic storage devices, or any other medium which can be used to store information for access by computer system platform 1200.

As shown in FIG. 12, computer system platform 1200 may communicate with other systems, components, or devices via communication interface 1270. Communication interface 1270 may embody computer readable instructions, data structures, program modules or other data in a modulated data signal (e.g., a carrier wave) or other transport mechanism. By way of example, and not limitation, communication interface 1270 may couple to wired media (e.g., a wired network, direct-wired connection, etc.) and/or wireless media (e.g., a wireless network, a wireless connection utilizing acoustic, RF, infrared, or other wireless signaling, etc.).

Communication interface 1270 may also couple computer system platform 1200 to one or more input devices (e.g., a keyboard, mouse, pen, voice input device, touch input device, etc.) and/or output devices (e.g., a display, speaker, printer, etc.).

As shown in FIG. 12, graphics processor 1250 may perform graphics processing operations on graphical data stored in frame buffer 1260 or another memory (e.g., 1220, 1240, 1245, etc.) of computer system platform 1200. In one embodiment, graphics processor 1250 and processor 1210 may be combined into a single unit (e.g., thereby forming a general purpose processor). Graphical data stored in frame buffer 1260 may be accessed, processed, and/or modified by components (e.g., graphics processor 1250, processor 1210, etc.) of computer system platform 1200 and/or components of other systems/devices. Additionally, the graphical data may be accessed (e.g., by graphics processor 1250) and displayed on an output device coupled to computer system platform 1200. Accordingly, memory 1220, removable storage 1240, non-removable storage 1245, frame buffer 1260, or a combination thereof, may comprise instructions that when executed on a processor (e.g., 1210, 1250, etc.) implement a method of varying an incoming light field (e.g., 140).

In the foregoing specification, embodiments of the invention have been described with reference to numerous specific details that may vary from implementation to implementation. Thus, the sole and exclusive indicator of what is, and is intended by the applicant to be, the invention is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A method of varying an incoming light field, said method comprising:
   detecting said incoming light field using an optical sensor, said incoming light field comprising a plurality of spatial radiometric attributes and impinging on a semi-transparent spatial light modulator;
   automatically determining a modulator setting for said spatial light modulator based upon said plurality of spatial radiometric attributes;
   dynamically adjusting said spatial light modulator based upon said modulator setting to vary said incoming light field, wherein said spatial light modulator comprises a first region and a second region, and wherein said dynamically adjusting further comprises contemporaneously adjusting said first region differently from said second region to cause a different amount of light to pass through said first and second regions.

2. The method of claim 1, wherein said plurality of spatial radiometric attributes comprise respective radiance values associated with respective spatial locations.

3. The method of claim 1, wherein said plurality of radiometric attributes comprise respective wavelength composition values associated with respective spatial locations.

4. The method of claim 1 further comprising:
   determining a parallax error associated with said incoming light field; and
   modifying said modulator setting based upon said parallax error, and wherein said dynamically adjusting comprises dynamically adjusting said spatial light modulator using said modified modulator setting to vary said incoming light field.

5. The method of claim 4, wherein said determining said parallax error comprises:
   tracking a feature of an observer of said incoming light field, wherein said feature is selected from a group consisting of a head and an eye of said observer; and
   determining said parallax error based upon a position of said feature.

6. The method of claim 1, wherein said adjusting said spatial light modulator comprises performing image processing on said incoming light field.

7. The method of claim 6, wherein said image processing is selected from a group consisting of tone mapping, color enhancement, beautification, edge enhancement, spectral separation of colors, spectral separation of metamers, and object emphasis.

8. A computer-usable medium having computer-readable program code embodied therein for causing a computer system to perform a method of varying an incoming light field, said method comprising:
   detecting said incoming light field using an optical sensor, said incoming light field comprising a plurality of spatial radiometric attributes and impinging on a semi-transparent spatial light modulator;
   automatically determining a modulator setting for said spatial light modulator based upon said plurality of spatial radiometric attributes;
   dynamically adjusting said spatial light modulator based upon said modulator setting to vary said incoming light field, wherein said spatial light modulator comprises a first region and a second region, and wherein said dynamically adjusting further comprises contemporaneously adjusting said first region differently from said second region to cause a different amount of light to pass through said first and second regions.

9. The computer-usable medium of claim 8, wherein said plurality of spatial radiometric attributes comprise respective radiance values associated with respective spatial locations.

10. The computer-usable medium of claim 8, wherein said plurality of radiometric attributes comprise respective wavelength composition values associated with respective spatial locations.

11. The computer-usable medium of claim 8, wherein said method further comprises:
    determining a parallax error associated with said incoming light field; and
    modifying said modulator setting based upon said parallax error, and wherein said dynamically adjusting comprises dynamically adjusting said spatial light modulator using said modified modulator setting to vary said incoming light field.

12. The computer-usable medium of claim 11, wherein said determining said parallax error comprises:
    tracking a feature of an observer of said incoming light field, wherein said feature is selected from a group consisting of a head and an eye of said observer; and
    determining said parallax error based upon a position of said feature.

13. The computer-usable medium of claim 8, wherein said adjusting said spatial light modulator comprises performing image processing on said incoming light field, and wherein said image processing is selected from a group consisting of tone mapping, color enhancement, beautification, edge enhancement, spectral separation of colors, spectral separation of metamers, object emphasis.

14. A system for varying an incoming light field, said system comprising:

an optical sensor operable to detect said incoming light field, said incoming light field comprising a plurality of spatial radiometric attributes;

a first component coupled to said optical sensor and operable to automatically determine a modulator setting for a spatial light modulator based upon said plurality of spatial radiometric attributes; and a semi-transparent spatial light modulator coupled to said component and operable to dynamically vary said incoming light field based upon said modulator setting, wherein said incoming light field impinges upon said spatial light modulator, wherein said spatial light modulator comprises a first region and a second region, and wherein said spatial light modulator is further operable to contemporaneously vary a first portion of said incoming light field associated with said first region differently from a second portion of said incoming light field associated with said second region to cause a different amount of light to pass through said first and second regions.

15. The system of claim 14, wherein said plurality of spatial radiometric attributes comprise respective radiance values associated with respective spatial locations.

16. The system of claim 14, wherein said plurality of radiometric attributes comprise respective wavelength composition values associated with respective spatial locations.

17. The system of claim 14 further comprising:

a second component for determining a parallax error associated with said incoming light field; and wherein said first component is further operable to automatically modify said modulator setting based upon said parallax error, and wherein said spatial light modulator is further operable to dynamically vary said incoming light field based upon said modified modulator setting.

18. The system of claim 17, wherein said second component is operable to determine said parallax error by tracking a feature of an observer of said incoming light field, wherein said feature is selected from a group consisting of a head and an eye of said observer, and wherein said second component is further operable to determine said parallax error based upon a position of said feature.

19. The system of claim 14, wherein said spatial light modulator is further operable to perform image processing on said incoming light field.

20. The method of claim 19, wherein said image processing is selected from a group consisting of tone mapping, color enhancement, beautification, edge enhancement, spectral separation of colors, spectral separation of metamers, and object emphasis.

* * * * *